Patented Oct. 22, 1935

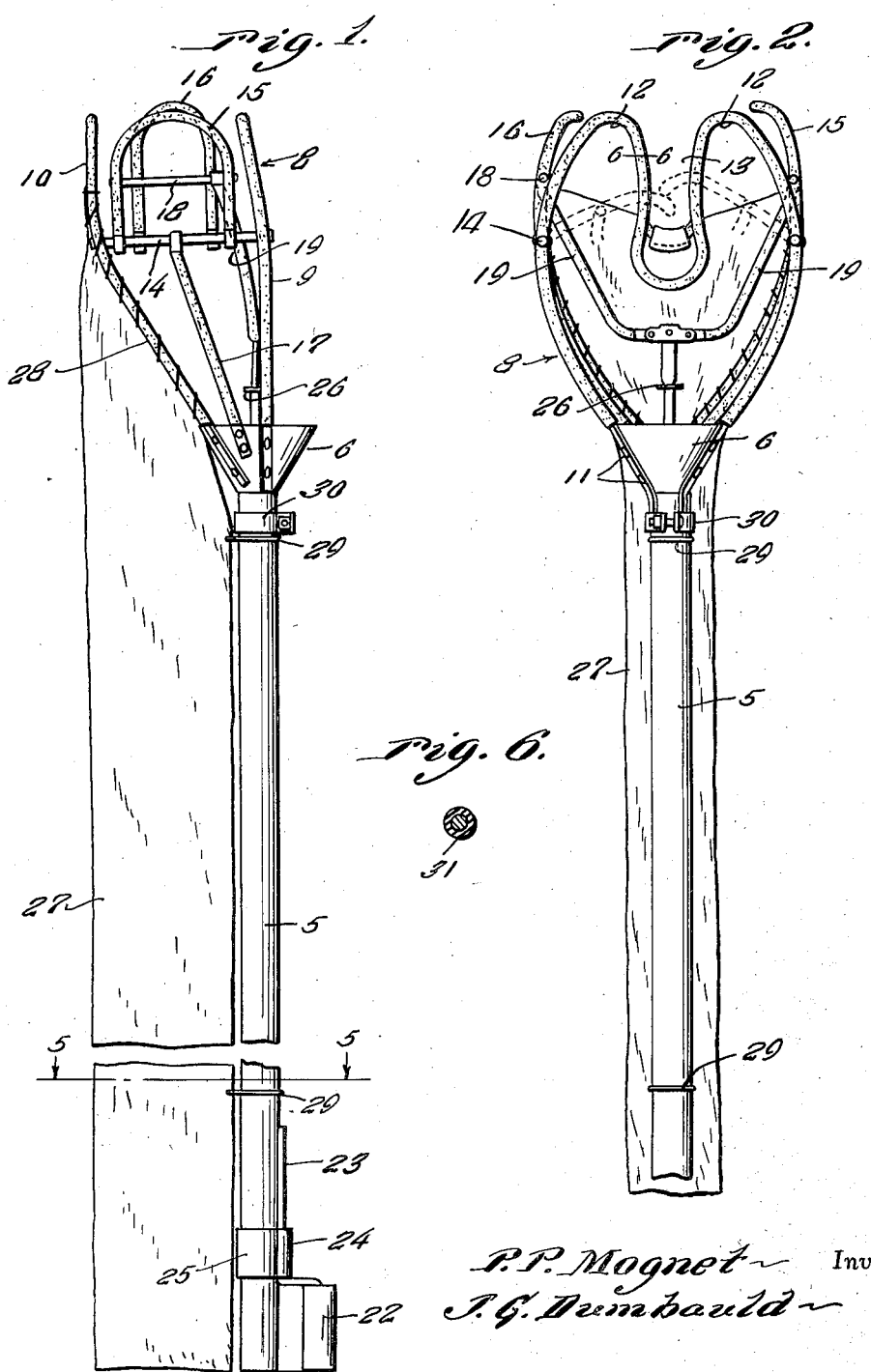

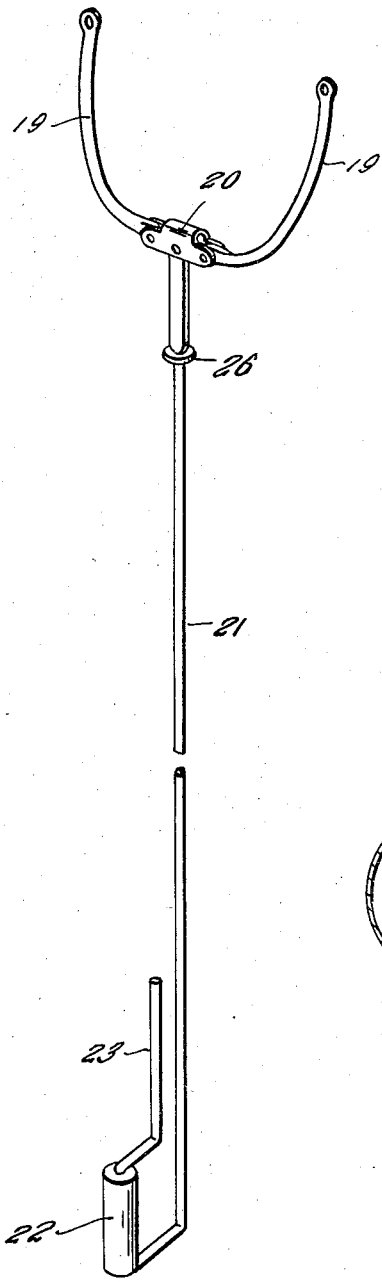
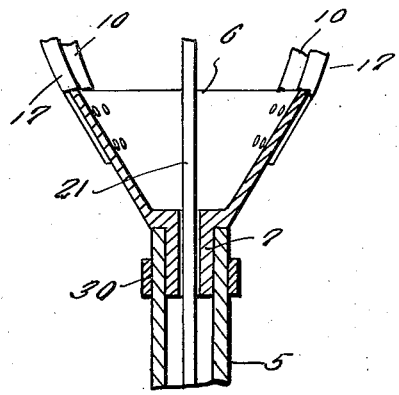
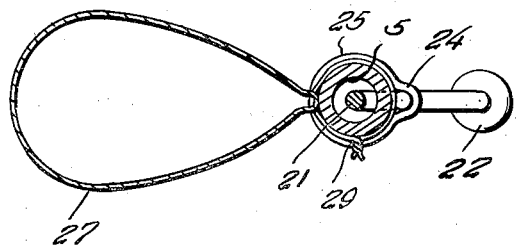

2,017,983

UNITED STATES PATENT OFFICE 2,017,983

FRUIT PICKER

Peter P. Mognet and Jacob G. Dumbauld, Somerset, Pa.

Application September 25, 1934, Serial No. 745,466

4 Claims. (Cl. 56—334)

This invention relates to new and useful improvements in a fruit picker, and has as its object the provision of a picker of the type equipped with pivoted jaws cooperable for picking the fruit from the limbs of the tree together with a bag arranged relative to the jaws for receiving the fruit as it is packed.

A further object of the invention is to provide an improved jaw structure for a fruit picker of the character suggested.

Other objects of the invention include the provision of a picker characterized by economy in construction as well as durability and efficiency in operation.

The invention, together with its objects and advantages, will be best understood from a study of the following description taken in connection with the accompanying drawings wherein:

Figure 1 is a side elevational view of the picker.

Figure 2 is an elevational view of the picker taken at right angles to Figure 1.

Figure 3 is a perspective view of the jaw operating rod and associated parts.

Figure 4 is a fragmentary detail sectional view showing the manner of securing the cage to the handle of the device.

Figure 5 is a detail view taken substantially on the line 5—5 of Figure 1.

Figure 6 is a detail view taken substantially on the line 6—6 of Figure 2.

Referring to the drawings by reference numerals, it will be seen that the picker comprises a tubular handle 5 which may be of any suitable length and formed from any suitable material. A cone 6 of metal or other suitable material is formed with an integral pin 7 that fits snugly within one end of the handle 5 as shown in Figure 4.

The cone 6 forms part of a cage indicated generally by the reference numeral 8. The cage 8 comprises a pair of opposed sides 9 and 10 respectively and each of these sides are formed from a single length of wire, copper, or other suitable material bent to provide a substantially oval shaped structure as suggested in Figure 2, the ends of the rods being secured to the cone 6 by rivets or in any other suitable manner as indicated at 11. At the upper portions thereof the sides 9 and 10 are provided with reverse bends 12 forming in the upper portion of each of the sides members a crotch 13 adapted to accommodate the stem or branch of the tree.

The sides 9 and 10 of the cage 8 are connected by rods 14 to which are pivoted substantially U-shaped jaws 15 and 16 respectively. Each of the jaws 15 and 16 is formed from a single length of wire, copper or other suitable material that is bent into U form and has the ends thereof disposed about the rods 14 in a manner to pivotally connect the jaws with the rod. One of the jaws as clearly shown in Figure 1, the jaw 15, is slightly wider than the other of the jaws, namely the jaw 16. Completing the cage structure are side straps 17 that are riveted or otherwise secured at one end to the cone 6 and at a relatively opposite end suitably secured to the rods 14.

The jaws 15 and 16 intermediate their ends are provided with rods 18 with which are pivotally engaged links 19 that are also pivotally connected to a head 20 provided on one end of the jaw operating rod 21.

The rod 21 is slidably accommodated in the handle 5 and at its free end the rod 21 is suitably bent to provide a roller equipped hand grip 22 and an extension 23. The extension 23 operates in a guide sleeve 24 secured to a band 25 embracing the lower portion of the handle 5. The guide sleeve 24 is preferably formed integral with the band 25.

At the upper end thereof the rod 21 has a flattened portion to which the head 20 is secured and at the lower end of the flattened portion of the rod is a stop flange or collar 26 that is adapted to engage the bottom of the cone 6 when the rod 21 is pulled through the handle 5 in a direction for moving the jaws 15 and 16 inwardly towards one another to engage therebetween the stem of the fruit for the picking of the fruit from the tree.

A fabric bag 27 of a type usually used in conjunction with jaw equipped pickers has the mouth thereof secured to the side 10 of the cage by a lacing 28. The bag 27 is also held substantially parallel to the handle 5 through the medium of retaining rings 29 engaged with the bag in any suitable manner and slidably embracing the handle 5.

A split clamping band 30 is also provided and embraces the upper portion of the handle 5 for contracting said handle about the pin 7 of the cone 6, it being noted that the ends of the rod from which the side 9 of the cage is formed extend along a portion of the handle 5 and are clamped by band 30.

To protect the fruit against bruising, the wires or the like which form the members 9, 10, 17, 15, and 16, as well as the link 19 are covered or encased by a sheathing 31 of rubber or other suitable material.

It will be apparent that in use the branch of the tree or bush is accommodated in the crotches 13 of the sides 9 and 10. By gripping the grip 22, the operator pulls down on the rod 21 causing the jaws 15 and 16 to move inwardly towards one another to engage the stem of the fruit in a manner to pick the fruit from the branch. The fruit thus picked will fall into the bag 27. The stem of the fruit is released by pushing the rod 21 upwardly to swing the jaws from the dotted line position shown in Figure 2 to the full line position shown in said figure.

What is claimed is:

1. A fruit picker comprising a tubular handle, a substantially frusto-conical member having an integral pin fitting within one end of the handle, a cage including a pair of side members secured at one end to said frusto-conical member, said side members having free ends provided with crotch portions for straddling a branch of a tree, a pair of cooperating jaws pivoted between the side members on shafts disposed at right angles to the side members, and means for swinging said jaws into open and closed positions including a rod slidably engaged with said handle.

2. A fruit picker comprising a tubular handle, a substantially frusto-conical member having an integral pin fitting within one end of the handle, a cage including a pair of side members secured at one end to said frusto-conical member, said side members having free ends provided with crotch portions for straddling a branch of a tree, a pair of cooperating jaws pivoted between the side members on shafts disposed at right angles to the side members, an operating rod for the jaws slidable through said handle, a head on one end of said rod, links pivotally connecting said head and jaws for transmitting movement of the rod to the jaws, and a hand grip on the free end of the said rod.

3. A fruit picker comprising a tubular handle, a substantially frusto-conical member having an integral pin fitting within one end of the handle, a cage including a pair of side members secured at one end to said frusto-conical member, said side members having free ends provided with crotch portions for straddling a branch of a tree, a pair of cooperating jaws pivoted between the side members on shafts disposed at right angles to the side members, an operating rod for the jaws slidable through said handle, a head on one end of said rod, links pivotally connecting said head and jaws for transmitting movement of the rod to the jaws, and said rod at its free end being reversely bent to provide a lateral hand grip and an integral guide, and a sleeve on said handle in which said guide operates.

4. A fruit picker comprising a tubular handle, a substantially frusto-conical member having an integral pin fitting within one end of the handle, a cage including a pair of side members secured at one end to said frusto-conical member, said side members having free ends provided with crotch portions for straddling a branch of a tree, a pair of cooperating jaws pivoted between the side members on shafts disposed at right angles to the side members, an operating rod for the jaws slidable through said handle, a head on one end of said rod, links pivotally connecting said head and jaws for transmitting movement of the rod to the jaws, and said rod at its free end being reversely bent to provide a lateral hand grip and an integral guide, a sleeve on said handle in which said guide operates, and a bag secured at its mouth to one of the side members of said cage, and means securing the bag at spaced intervals to said handle.

PETER P. MOGNET.
JACOB G. DUMBAULD.